No. 670,533. Patented Mar. 26, 1901.
A. A. A. BYRD.
EXPANDING MANDREL AND CHUCK.
(Application filed June 19, 1900.)
(No Model.)
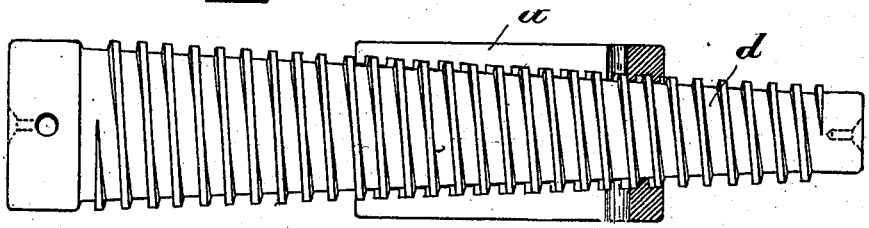
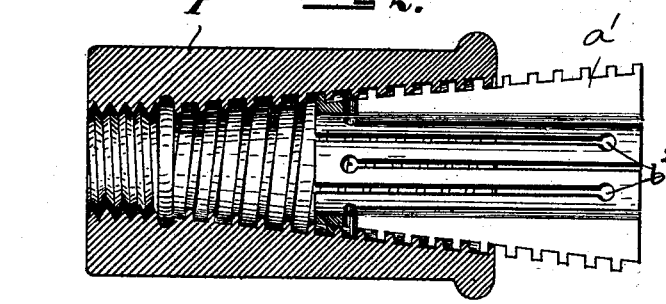
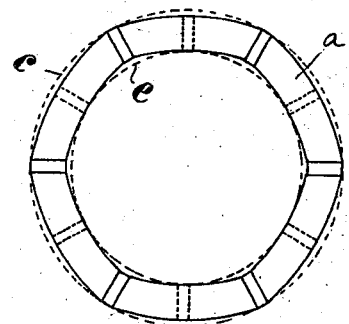
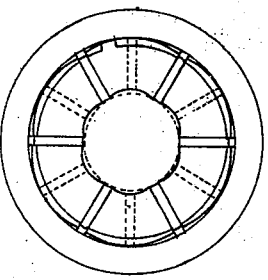
WITNESSES
Ella L. Giles
Otto Munk
INVENTOR
Antony Albert Augustus Byrd
BY
Richardson

UNITED STATES PATENT OFFICE.

ANTHONY ALBERT AUGUSTUS BYRD, OF EDMONTON, ENGLAND.

EXPANDING-MANDREL AND CHUCK.

SPECIFICATION forming part of Letters Patent No. 670,533, dated March 26, 1901.

Application filed June 19, 1900. Serial No. 20,869. (No model.)

*To all whom it may concern:*

Be it known that I, ANTHONY ALBERT AUGUSTUS BYRD, a subject of the Queen of England, and a resident of Lower Edmonton, England, have invented certain new and useful Improvements in Expanding - Mandrels and Chucks, of which the following is a specification.

My invention relates more especially to improvements in chuck-sleeves of that class in which the sleeve is provided with axial cuts or slots extending alternately from opposite ends, whereby contraction and expansion are permitted and the diameter maintained uniform throughout.

The objects of the invention are, first, to provide means for securing a greater amount of friction between the sleeve and the work to be operated upon; second, to reduce the friction between the sleeve and the mandrel or arbor, and, lastly, to prevent binding of threads when the sleeve and arbor are threaded.

The invention is illustrated in the accompanying drawings, in which—

Figure 1 is a sectional elevation of an adjustable chuck for holding the work upon its exterior surface with an interior arbor. Fig. 2 is a similar view of a chuck for holding work upon its interior surface. Fig. 3 is a side elevation of the sleeve or chuck of Fig. 1. Fig. 4 is an end view thereof. Fig. 5 is a similar view on a larger scale, and Fig. 6 is an end view of Fig. 2.

In the drawings, referring first to Figs. 1, 3, 4, and 5, $a$ designates the chuck or expanding-sleeve, which is shown mounted upon the screw mandrel or arbor $d$. The sleeve $a$ is provided with a plurality of axial slits or cuts $b'$, extending alternately from each end to near the opposite end, as clearly shown in Fig. 3, thus forming intermediate bars $b$. Heretofore this sleeve or mandrel has been made with its surface which contacts with the work to be carried thereby formed on a curve, the diameter of which does not exceed the greatest diameter to which the sleeve is be expanded. In order to secure greater frictional contact between the surface of the sleeve and the work carried thereby than is possible with this arrangement, I form the said sleeve in such manner that each bar $b$ or portion lying between adjoining slots has its bearing-surface formed on the arc of a circle the diameter of which exceeds the maximum diameter to which the sleeve is to be expanded, as shown in Figs. 4 and 5, the dotted lines $c$, Fig. 5, indicating the maximum diameter of the sleeve. In order to reduce the frictional contact between the sleeve and the expanding-mandrel, the inner faces of the portions $b$ are in a like manner formed on the arc of a circle whose diameter is greater than the maximum diameter of the sleeve, as shown in Fig. 5.

Referring to Fig. 2, in which $f$ designates the mandrel and $a'$ the sleeve, which is adapted to be clamped upon the exterior of the work to be operated upon, it will be seen that this operates in the reverse manner from the form just described, and hence the curves of the inner and outer faces of the bars or parts between the slots $b^2$ are struck on arcs of circles less than the minimum diameter of the sleeve.

In order to further reduce the friction between the arbor and mandrel when the parts are threaded, I form the interlocking threads of each part narrower than the spaces between the threads, as shown in Figs. 1 and 2.

Having thus described my invention, what I claim is—

1. In combination a slitted sleeve or chuck and a mandrel for applying pressure thereto, said chuck having a plurality of longitudinally-arranged rounded faces bearing against the surface of the chuck, said rounded faces being each struck on the arc of a circle differing from the curve of the surface of the mandrel, substantially as described.

2. In combination, a threaded slitted sleeve, and a threaded mandrel for applying pressure thereto, the threads of each part being narrower than the space between the threads substantially as described.

In witness whereof I have hereunto set my hand in presence of two witnesses.

ANTHONY ALBERT AUGUSTUS BYRD.

Witnesses:
H. D. JAMESON,
A. NUTTING.